(12) United States Patent
Raphael

(10) Patent No.: US 10,397,971 B2
(45) Date of Patent: Aug. 27, 2019

(54) SYSTEM AND METHOD FOR PROXIMITY BASED NETWORKED MOBILE COMMUNICATION

(71) Applicant: Oren Raphael, San Francisco, CA (US)

(72) Inventor: Oren Raphael, San Francisco, CA (US)

(73) Assignee: Oren Raphael, San Francisco, CA (US)

( * ) Notice: Subject to any disclaimer, the term of this patent is extended or adjusted under 35 U.S.C. 154(b) by 0 days.

(21) Appl. No.: 15/846,972

(22) Filed: Dec. 19, 2017

(65) Prior Publication Data

US 2018/0110079 A1    Apr. 19, 2018

Related U.S. Application Data

(63) Continuation of application No. 15/132,868, filed on Apr. 19, 2016, now Pat. No. 9,854,616.

(60) Provisional application No. 62/260,593, filed on Nov. 29, 2015, provisional application No. 62/218,487, filed on Sep. 14, 2015, provisional application No. 62/152,838, filed on Apr. 25, 2015.

(51) Int. Cl.

| | | |
|---|---|---|
| *H04W 4/08* | (2009.01) | |
| *H04W 76/10* | (2018.01) | |
| *H04B 3/54* | (2006.01) | |
| *H04W 76/14* | (2018.01) | |
| *H04W 76/11* | (2018.01) | |
| *H04W 4/80* | (2018.01) | |
| *H04L 29/08* | (2006.01) | |
| *H04W 4/21* | (2018.01) | |
| *H04W 8/18* | (2009.01) | |
| *H04W 8/00* | (2009.01) | |
| *H04W 8/02* | (2009.01) | |

(52) U.S. Cl.
CPC .......... *H04W 76/14* (2018.02); *H04L 67/306* (2013.01); *H04W 4/08* (2013.01); *H04W 4/21* (2018.02); *H04W 4/80* (2018.02); *H04W 8/186* (2013.01); *H04W 76/11* (2018.02); *H04W 8/005* (2013.01); *H04W 8/02* (2013.01)

(58) Field of Classification Search
CPC ... H04W 76/023; H04W 4/80; H04W 76/021; H04W 76/02; H04B 3/544; H04B 5/0025
See application file for complete search history.

(56) References Cited

U.S. PATENT DOCUMENTS

| | | | |
|---|---|---|---|
| 9,854,616 B2 * | 12/2017 | Raphael | ................. H04W 4/08 |
| 2004/0003037 A1 | 1/2004 | Fujimoto | |
| 2005/0154698 A1 | 7/2005 | Ikezawa | |
| 2008/0285542 A1 | 11/2008 | Jachner | |
| 2010/0005520 A1 | 1/2010 | Abbot | |
| 2010/0100617 A1 | 4/2010 | Rossi et al. | |

(Continued)

*Primary Examiner* — Andrew Wendell
(74) *Attorney, Agent, or Firm* — Nath, Goldberg & Meyer; Jerald L. Meyer; Stanley N. Protigal

(57) ABSTRACT

Communication between users of mobile devices is provided based on proximities between the users. Users are given unique identifiers, which are stored on a server, and mobile devices with the unique identifiers broadcast transmissions with their unique identifiers. The mobile devices listen for incoming identifiers from other mobile devices, and devices are detected directly or through an external radio communication device or hotspot. Additionally, indirect detection through another mobile device or hotspot is used to linking the first mobile device and the second mobile device.

23 Claims, 9 Drawing Sheets

(56) References Cited

U.S. PATENT DOCUMENTS

| | | | |
|---|---|---|---|
| 2010/0280904 A1* | 11/2010 | Ahuja | G06Q 30/02 |
| | | | 705/14.58 |
| 2011/0071972 A1 | 3/2011 | Zmolek | |
| 2011/0238755 A1 | 9/2011 | Khan et al. | |
| 2012/0047087 A1 | 2/2012 | Amidon | |
| 2012/0321143 A1 | 12/2012 | Krupka et al. | |
| 2013/0090106 A1* | 4/2013 | Mathews | H04W 4/06 |
| | | | 455/418 |
| 2013/0190018 A1* | 7/2013 | Mathews | H04W 4/023 |
| | | | 455/456.6 |
| 2015/0171926 A1 | 6/2015 | Coelho | |
| 2018/0227066 A1* | 8/2018 | Fayyad | H04H 60/372 |

* cited by examiner

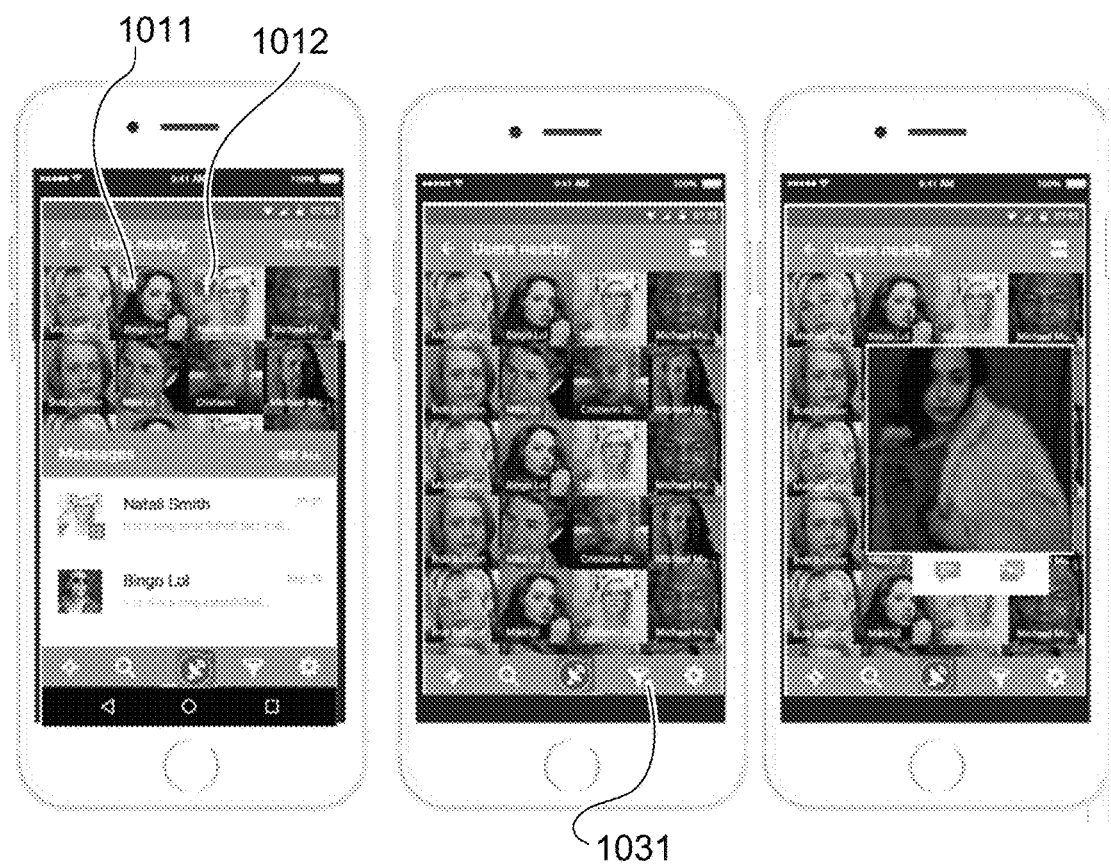
*Fig. 10A*  *Fig. 10B*  *Fig. 10C*

SYSTEM AND METHOD FOR PROXIMITY BASED NETWORKED MOBILE COMMUNICATION

RELATED APPLICATIONS

The present disclosure is a Continuation Application of U.S. patent application Ser. No. 15/132,868, filed Apr. 19, 2016, now U.S. Pat. No. 9,854,616, issued Dec. 26, 2017. U.S. patent application Ser. No. 15/132,868 claims priority to Provisional Patent Application No. 62/152,838 filed Apr. 25, 2015, Provisional Patent Application No. 62/218,487 filed Sep. 14, 2015 and Provisional Patent Application No. 62/260,593 filed Nov. 29, 2015, which are filed by the inventors hereof and the entirety of which are incorporated by reference herein.

BACKGROUND

Field

The present disclosure relates generally to digital communication systems and methods and more specifically to digital communication systems and methods for proximity based networked mobile communication.

Background

Users of mobile communication devices are able to connect with one another through the use of social networking platforms in conjunction with applications on the mobile communication devices using a communication protocol. The communication protocol can be cellular or wireless based. In order to connect with a member of a social networking platform, a user of a mobile communication device must first register with the social networking platform and have some knowledge of the member to whom the connection is desired. The knowledge of the member allows the user of the mobile communication device to send a connection request to the member.

Normally, acceptance of the connection request by the member is required for the user of the mobile communication device to communicate directly with the member. Without information identifying or related to a member of a social networking platform, the user of the mobile communication device is seemingly a stranger and has no way of communicating with the member.

In the case of people within proximity to one another, there may be further reason to connect while using a wireless device, for example, if face-to-face communication is impractical or socially awkward. It is within the aforementioned context that a need for the disclosed technology has arisen. Thus, there is a need to provide a way of establishing wireless communication based at least in part on proximity of users to each other.

SUMMARY

Communications are provided between users of mobile devices based on proximities between the users. The users are registered on one or more servers. A unique identifier is generated for each user, is stored on one or more servers, and providing the unique identifier to the respective mobile devices to be stored on the respective mobile devices, and a user profile us associated with each unique identifier. At least a plurality of the mobile devices broadcast transmissions with their unique identifiers, and at least a plurality of the mobile devices listen for incoming identifiers from other mobile devices. In the case of a first mobile device detecting a second mobile device, the first mobile device receives the a unique identifier associated with the second mobile device.

The unique identifiers of the first and second mobile devices are used to establish detection. The detection comprises detections made directly between two devices, detection between two devices through an external radio communication device or hotspot, or indirect detection through another mobile device or devices linking the first mobile device and the second mobile device. The established detection is used to form a group of two or more mobile devices. A list of users or an updated list of users in the group. If the first mobile device does not have the profile information regarding users associated with other mobile devices in the group, at least a subset of profile information associated with the list of users in the group to the first mobile device is provided.

BRIEF DESCRIPTION OF THE DRAWINGS

FIG. 2A illustrates a system for proximity based networked mobile communication in which at least one mobile device is outside of Wi-Fi range. FIG. 2B illustrates a system for proximity based networked mobile communication communicating with users within Wi-Fi range of each other. FIG. 2C illustrates a system for proximity based networked mobile communication used to communicate with a fixed station.

FIG. 3A illustrates a mobile application process according to the present disclosure. FIG. 3B illustrates a mobile application process according to the present disclosure.

FIG. 7A shows a configuration in which "inactive mode" response is not enabled. FIG. 7B shows what a proximity-based system in accordance with the mobile device able to respond when in an "inactive" state.

FIGS. 10A-10C are representations of mobile device displays of contacts or other users to provide a proximity display. FIG. 10A depicts a starting page. FIG. 10B depicts a similar page obtained by removing message information.

FIG. 11A shows establishing proximity. FIG.

Figures 11A, 11B:
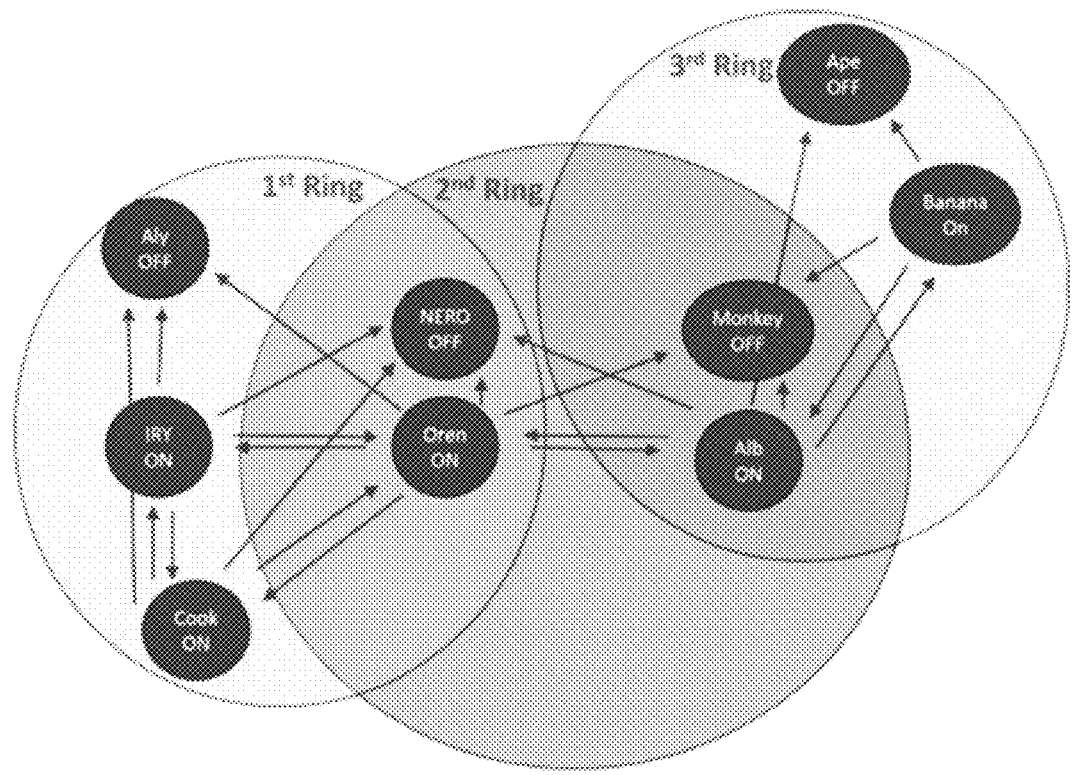
FIGS. 11A and 11B are schematic diagrams depicting a Presence Group Aggregation System platform in its functional aspect.

11B is a three ring model, based on the diagram of FIG. 11A, based on a user's nearby user experience.

DETAILED DESCRIPTION

Overview

Various aspects of methods and systems for proximity based networked mobile communication can be found in exemplary configurations of the disclosed technology. References are made in detail to the configurations of the disclosed technology, non-limiting examples of which are illustrated in the accompanying drawings. While the disclosed technology will be described in conjunction with the disclosed configurations, it will be understood that they are not intended to limit the disclosed technology to these configurations. On the contrary, the disclosed technology is intended to cover alternatives, modifications and equivalents, which may be included within the spirit and scope of the disclosed technology as defined by the appended claims. Furthermore, in the following detailed description, numerous specific details are set forth to provide a thorough understanding of the disclosed technology, which can be practiced by one of ordinary skill in the art without these specific details. In other instances, well-known methods, procedures, components, and circuits have not been described in detail as to not unnecessarily obscure aspects of the present disclosure.

In a first configuration, a plurality of users each associated with a mobile computing device is within proximity of a wireless frequency range including Wi-Fi and/or Bluetooth (registered trademark of Bluetooth Special Interest Group of Kirkland, Wash.). A mobile application on a registered mobile computing device causes the mobile computing device to advertise and listen to unique user identifiers via wireless including Bluetooth frequencies. In this context, "advertise" refers to broadcast of data so that other devices within range may become aware of the presence of the device broadcasting the data. Detected unique identification phone data from the advertisements comprising Unique User Identification (UUID) such as Bluetooth Low Energy UUID &/or Randomly Generated Identifier from 0 to 4294967295, MAC address and SSID information are transmitted in a query to the server system and cross referenced with registered member information. By the use of unique identifiers, obtained as either direct device identification (e.g., MAC address) or assigned identifiers (e.g., UUID), positive matches of registered members are displayed on the mobile computing device and communication between the mobile computing device and mobile computing devices associated with registered members is enabled. The use of a UUID has particular advantages, in that the UUID is intended for broadcast transmission, whereas some other identifiers, such as MAC addresses, are not always available for security or other reasons.

While specific examples of communication protocols are described, it is contemplated that other communication protocols may be used in accordance with the present disclosure.

According to the present disclosure, a registered user of the proximity based networked communication system can communicate with other registered users purely based on proximity rather than prior knowledge of the registered users. A registered user of the proximity based networked communication system can broadcast a message, view profiles of nearby users, comment on photos, and anonymously and non-anonymously choose "Gifts" to post next to the picture, call and/or video conference to other registered users who are within proximity of the registered user. Examples of such a scenario include social scenarios as well as law-enforcement scenarios such as Amber alerts (information regarding missing children).

In addition to the above-referenced functionalities, the system can show both users each other as soon as the first user sees the second user. The system does not wait for B to identify A; it already shows A on B's display screen as soon as B is shown on A's screen. The system also shows A what is on C's Screen. By way of non-limiting example, A sees B and C but does not see D, either because D is too far away or because it just has not processed the information concerning D yet. So long as someone else sees D, then A will see D as well. For example, if either B or C sees D, then A will see D as well. In this manner, there are no communication delays because users can observe each other at different times, in some cases with minute differentials. As soon as one person in the room picks up, everyone else gets up to speed.

The users' phone number database can also be integrated such that the system provides a warning that someone in their phone book contacts is within a user's "proximity zone". The system may create special status for people that the user wishes to see or avoid. The special status for people that the user wishes to see can include, by way of non-limiting example, best friends or crushes, so that one can observe which of their social media contacts, friends and friends of friends are within the proximity. The special status for people that the user wishes to avoid can include former partners, people restricted by restraining orders, parents, friends and relatives. The system also has a capability of using a sex offender database to warn parents that that a possible sex offender is within the Wi-Fi-"danger" zone or proximity.

The system can cross reference phone numbers and social media stored within the phone. The system may also be integrated with social networking and professional social networking profiles with this application for business conferences.

Integration of Tinder and similar dating and/or a features allows users to indicate dating and/or business interest in other nearby users, and which will only notify the other users if the other user also indicated this same interest. This system will be highly effective and efficient in matchmaking between people within conferences, nightclubs and bars. As an adjunct to this, the system can link to niche dating sites and other special interest groups, so that users who so-desire can identify other users who are in the proximity and who share the same common interests. The system can further filter such associations according to subscriber status, provided that the site permits such information to be accessed. According to one non-limiting configuration, information concerning special interests is provided only if the user is also subscribed to or identified with the special interest. According to another configuration, the user can select whether to limit disclosure of the special interest.

Integration with point of sale systems such as Google Wallet, ApplePay and Paypal may be obtained. Integration with social media sites (e.g., Facebook) can be used to allow members to send invites and to reveal their social media links and their mutual friends when in social venues where they would like to share that information. In different non-limiting configurations, payment can be made through the system, externally, or according to the user's choice.

The disclosed technology will additionally provide a peer-to-peer ride sharing platform which will allow users to send ride requests by selecting their destination and choosing their own price that they are willing to pay. All nearby users of the disclosed technology will receive this ride request and they will have the ability to agree or to send a counter offer. The close range network will be ideal in providing the user with individuals who are in the immediate vicinity and thus immediately ready to initiate the requested journey. The Payment processing system will require users to scan a credit card and will hold a deposit in order to only allow prepaid users to send ride requests.

Instant Food Delivery Service: The disclosed technology will also provide users the ability to request food at the click of a button. Utilizing a proximity nearby user that represents the nearby food production services, for example the nearby restaurants will be able to join the network using a special commercial account, and this will allow users to instantly make orders by clicking on the Profiles of these nearby options. This will provide the the advantage of exclusively providing its own food delivery services to nearby users.

Face Recognition Database of Similarities in People

The disclosed technology is useful, when coupled with facial images, to associate these individuals with profiles of individuals in proximity to the user, receiving, from the mobile device an image of a person. Facial recognition can be used to determine if a match exists between the image and a user detected in proximity to the device providing the image of the person. This is useful for identification of people who a user may recognize but not know their name and for assisting people with prosopagnosia.

If a user provides an image of a person to the server, the server can use facial recognition to determine if a match exists between the image and a user in proximity to the user providing the image.

The disclosed technology will additionally have the ability to provide users with other individuals in the database that most resemble that individual. Resemblance is measured with facial recognition algorithms that represent deviations in facial features and dimensions. This service provides entertainment value as well as the service of giving people "another chance" at romance with their specific taste. In different non-limiting configurations, the face recognition can be performed by the user's mobile device or by face recognition software on a server.

Technique

Figure 1:
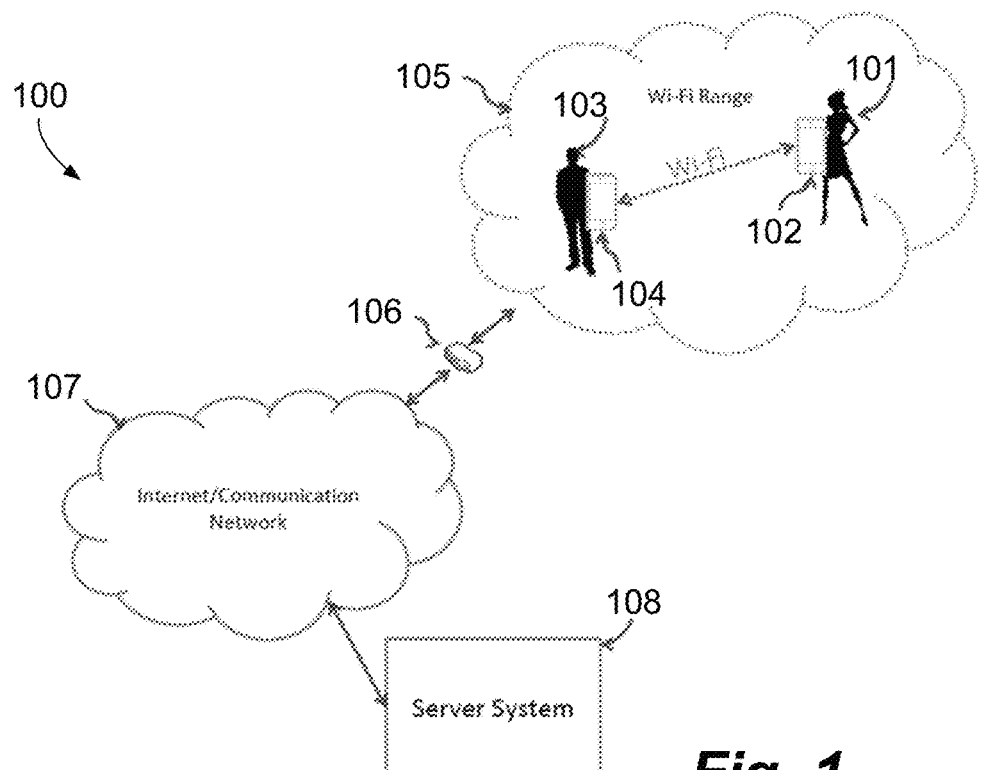
FIG. 1 is a schematic diagram illustrating a system for proximity based networked mobile communication according to the present disclosure.

FIG. 1 is a schematic diagram illustrating a system for proximity based networked mobile communication 100 according to the present disclosure. In FIG. 1, proximity based networked mobile communication system 100 comprises a first mobile device 101 having a first mobile computing device 102 communicably coupled via internet/communication network 107 to server system 108. The system 100 further comprises a second mobile device 103 having a second mobile computing device 104 communicably coupled via internet/communication network 107 to server system 108. Internet/communication network 107 can be any communication network that allows data to be communicated or transferred from one point to another. Such a network might be wired or wireless as deemed necessary to be consistent with the spirit and scope of the present disclosure.

In FIG. 1, the first mobile device 101 can utilize a mobile application (not shown here) on mobile computing device 102 to access server system 108 to register with server system 108 to become a member of the proximity based networked mobile communication system. The second mobile device 103 can utilize a mobile application (not shown here) on mobile computing device 104 to access server system 108 to register with server system 108 to also become a member of the proximity based networked mobile communication system. The first mobile device 101 and second mobile device 103 utilize the mobile application on their respective devices (102, 104) to communicate with each other while their devices are both within a wireless frequency range including Wi-Fi and/or Bluetooth 105. Wireless frequency range including Wi-Fi and/or Bluetooth 105 is associated with internet router 106; that is, in the present configuration, internet router 106 is either Bluetooth enabled and/or has Wi-Fi capability.

Router 106 receives data from internet/communication network. Router 106 is a Wi-Fi router capable of receiving data from the internet and that is compliant with 802.11 standards or with other appropriate standards. Router 106, as mentioned, is capable of receiving data from internet/communication network 107. Router 106 is also/or Bluetooth capable, operating in the unlicensed industrial, scientific and medical (ISM) band at 2.4 to 2.485 GHz, using a spread spectrum, frequency hopping, full-duplex signal at a nominal rate of 1600 hops/sec. It will be appreciated that, while the present disclosure depicts mobile computing device as smartphones, any mobile computing device with the computing and communication capabilities to perform the functionalities described herein are within the scope of the present disclosure.

The first mobile device 101 and second mobile device 103 can then perform functionalities related to proximity based networked mobile communication consistent with the spirit and scope of the present disclosure. Although not shown, further descriptions of various configurations of the disclosed technology will be described with reference to the following figures.

Figure 2A:
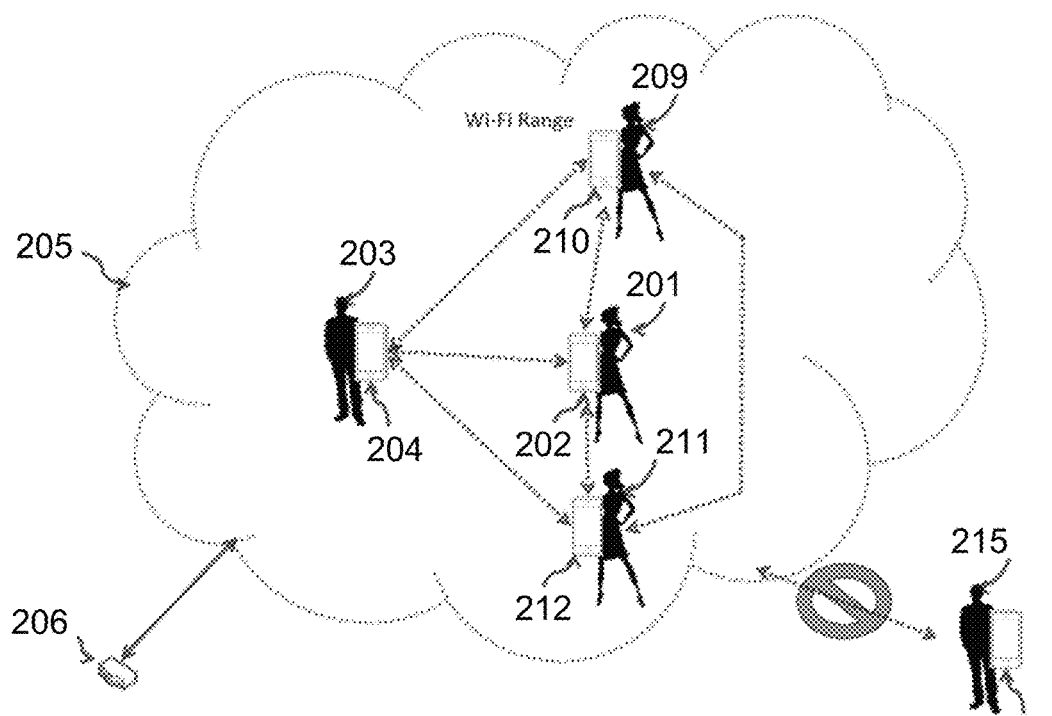
FIGS. 2A-2C are schematic diagrams illustrating a system for proximity based networked mobile communications in various environments.
Figure 2B:
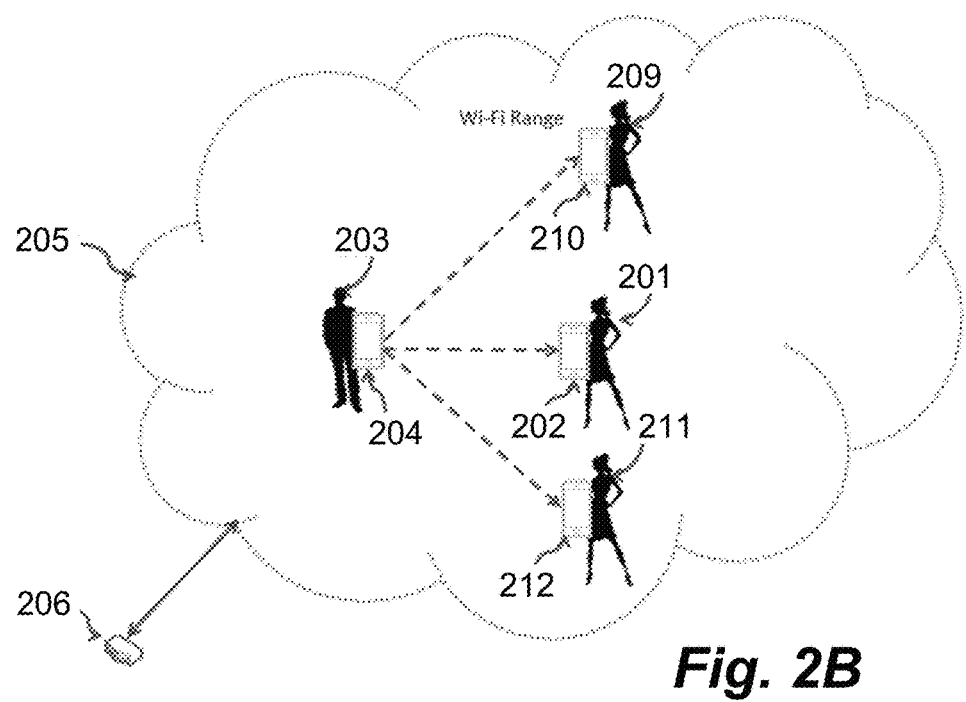
Figure 2C:
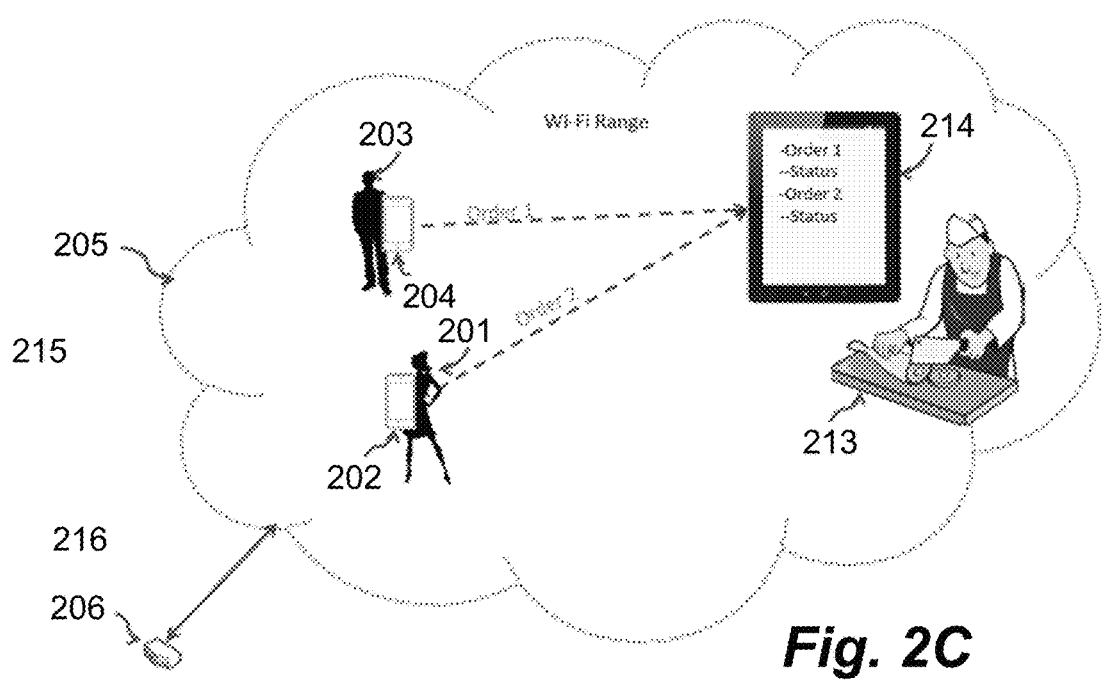

FIGS. 2A-2C are schematic diagrams illustrating a system for proximity based networked mobile communications in various environments. FIG. 2A illustrates a system for proximity based networked mobile communication in which at least one mobile device is outside of Wi-Fi range. FIG. 2B illustrates a system for proximity based networked mobile communication communicating with users within Wi-Fi range of each other. FIG. 2C illustrates a system for proximity based networked mobile communication used to communicate with a fixed station.

In FIG. 2A, internet router 206 provides for wireless frequencies including wireless frequency range including Wi-Fi and/or Bluetooth 205. Users 201, 203, 209, and 211 each have respective mobile computing devices 202, 204, 210, and 212 and all of them are within wireless frequency range including Wi-Fi and/or Bluetooth 205.

Because all of the users 201, 203, 209, and 211 and their respective mobile computing devices 202, 204, 210, and 212 are within wireless frequency range including Wi-Fi and/or Bluetooth 205, and because they are all registered members of the proximity based networked mobile communication system, they can all communicate with each other.

In FIG. 2A, a user 215 having mobile computing device 216, is not within the wireless frequency range including Wi-Fi and/or Bluetooth 205. Regardless of whether user 215 is registered with the proximity based networked mobile communication system, because user 215 is outside of the wireless frequency range including Wi-Fi and/or Bluetooth 205, the users and their mobile computing devices within the wireless frequency range including Wi-Fi and/or Bluetooth cannot communicate with user 215 through the system.

Optionally, each of the users 201, 203, 209 and 211 may use their respective mobile computing devices 202, 204, 210, and 212 while within wireless frequency range including Wi-Fi and/or Bluetooth 205 to request a social networking connection with any of the other devices. Social networking can include Facebook, Twitter, Instagram, and the like, as well as specialized and professional social networking services.

FIG. 2B illustrates a system for proximity based networked mobile communication 220 according to the present disclosure. In FIG. 2B, internet router 206 provides for a wireless frequency range including Wi-Fi and/or Bluetooth 205. Users 201, 203, 209, and 211 each have respective mobile computing devices 202, 204, 210, and 212 and all of them are within wireless frequency range including Wi-Fi and/or Bluetooth 205.

In FIG. 2B, all of the users 201, 203, 209, and 211 and their respective mobile computing devices 202, 204, 210, and 212 are within wireless frequency range including Wi-Fi and/or Bluetooth 205. Because they are all registered members of the proximity based networked mobile communication system, user 203 can broadcast a message, call and/or video conference and view/comment/"gift" photos using mobile computing device 204 to the other users 209, 201, 211 and their devices 210, 202, 212.

FIG. 2C illustrates a system for proximity based networked mobile communication 240 according to the present disclosure. In FIG. 2C, internet router 206 provides for a wireless frequency range including Wi-Fi and/or Bluetooth 205. Users 201, 203, and 213 each have respective mobile computing devices 202, 204, and 214 and all of them are within wireless frequency range including Wi-Fi and/or Bluetooth 205. Alternatively, it is possible to provide one or more devices, such as device 214, which is wire-connected, provided it can communicate, albeit indirectly, with the wireless network 205. In linking a wire-connected device, it may be desired to identify the location of the wire-connected device. This can be done by inference, in that the device is connected to a communication device with a known location, by manual input of location or by matching the location of the wire-connected device to that of a wireless device.

In FIG. 2C, user 213 provides a service or product desired by users 201 and 203. All of the users 201, 203, and 213 and their respective mobile computing devices 202, 204, and 214 are within wireless frequency range including Wi-Fi and/or Bluetooth 205. They are all registered members of the proximity based networked mobile communication system. As a result, users 203 and 201 can use their respective devices 204 and 202 to transmit order requests to user 213's computing device 214. Further, users 203 and 201 can use their respective devices 204 and 202 to complete payment for their orders via payment processing with computing device 214 and a third party payment service.

Figures 3A, 3B:
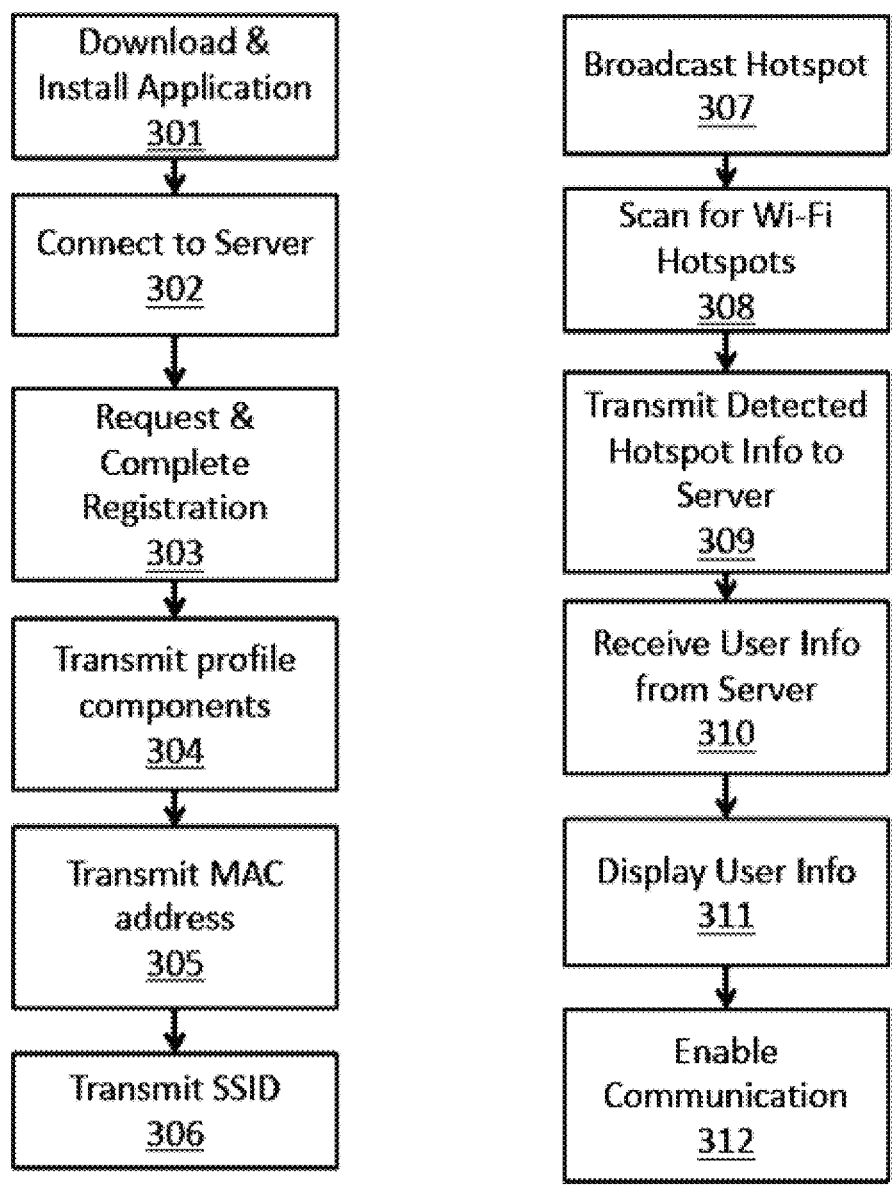
FIGS. 3A and 3B are schematic flow charts showing downloading, installation and registration of a mobile device.

FIGS. 3A and 3B are schematic flow chart showing the installation and operation of a mobile application process onto a mobile device. FIG. 3A illustrates the mobile application process according to the present disclosure. FIG. 3B illustrates a mobile application process according to the present disclosure. The mobile application enables the mobile computing device to communicate on the networked communication system according to the present disclosure.

In FIG. 3A, a user having a mobile computing device downloads and installs a mobile application (step 301) onto the device. The mobile application causes the mobile computing device to connect to a remote server (step 302). Through the mobile application, the user registers with the remote server (step 303). As part of registration, profile components are transmitted from the mobile computing device to the server (step 304). Profile components can include the user's name and a digital photograph of the user, as well as any other information the user would like to include in the profile.

In FIG. 3A, the mobile application further causes the mobile computing device to transmit the device's Unique Identifiers, including but not limited to a randomly generated identifier, Unique User Identification (UUID) such as Bluetooth Low Energy UUID &/or Randomly Generated Identifier from 0 to 4294967295, MAC address (step 305) to the server as well as an SSID (step 306).

In FIG. 3B, a mobile application causes a mobile computing device to broadcast an "advertisement hotspot" (step 307) for a predefined period of time. The predefined period of time can be based on proximity and frequency of user input or stimuli. Within this context, "advertising" refers to signaling the presence of a mobile device, such as by transmitting a radio beacon.

The mobile application further causes the mobile computing device to scan "listen" for Wi-Fi and Bluetooth advertisements, for example by using a Bluetooth LE Advertising Capability, or hotspots (step 308). The mobile computing device transmits the detected unique identification hotspot information to the remote server system (step 309). Upon comparison by the remote server system of the hotspot information and unique identifier for example UUID or MAC addresses, the mobile computing device receives user information from the server (step 310).

In FIG. 3B, the mobile application displays the received user information (step 311), thereby displaying registered users within proximity of the mobile computing device. Finally, communication is enabled (step 312) between the mobile computing device and any of the registered users within proximity of the mobile computing device. According to one configuration, communication between the mobile computing device and the registered users within proximity of the mobile computing device only continues as long as the mobile computing device and devices associated with the registered users remain within proximity of the mobile computing device.

Figure 4:
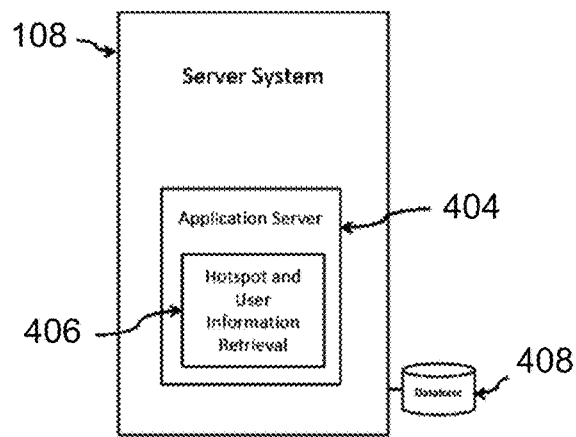
FIG. 4 is a schematic block diagram illustrating a server system according to the present disclosure.

FIG. 4 is a schematic block diagram illustrating a server system 108 according to the present disclosure. In FIG. 4, server system 108 includes application server 404. Application server 404 controls all networked communication capabilities accessible by members of the network. Mobile computing devices associated with members of the system transmit information to the server system 108. The information is processed by a hotspot (Unique Identifier Advertisement) and user information retrieval module 406. Server 108 is communicably coupled to database 418, in which information for all registered users and hotspots and device information is stored.

Figure 5:
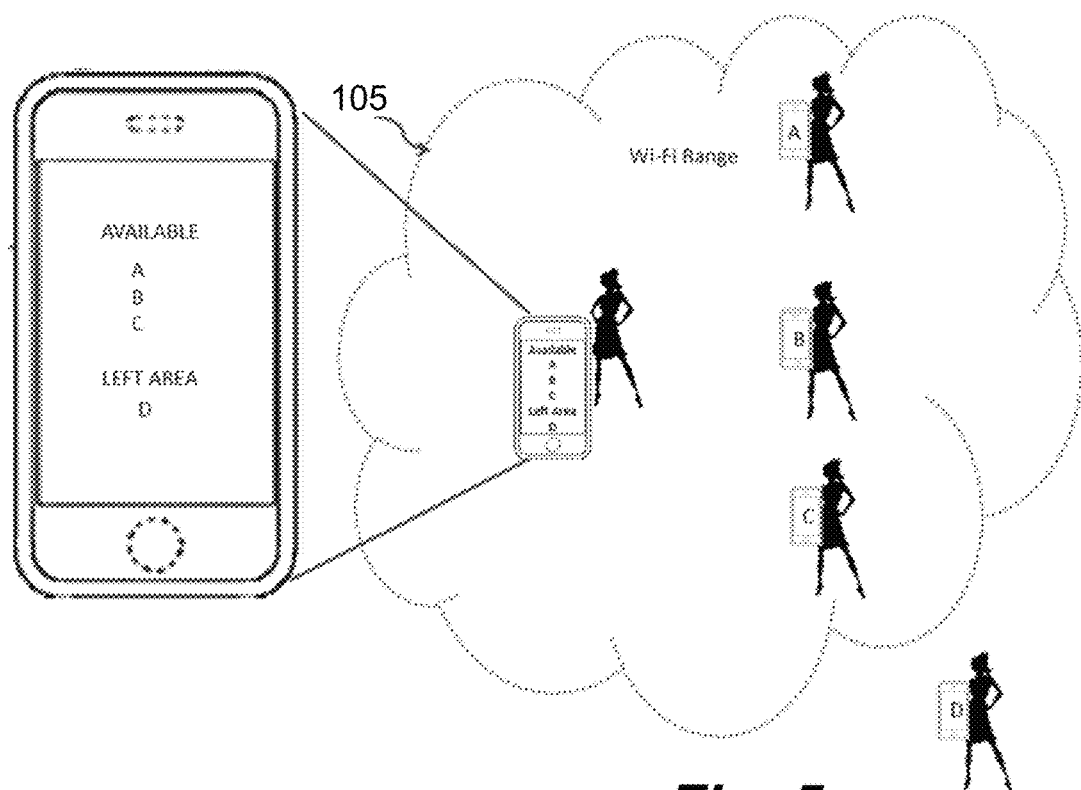
FIG. 5 is a schematic diagram illustrating a user interface scenario according to the present disclosure.

FIG. 5 is a schematic diagram illustrating a user interface scenario according to the present disclosure. In FIG. 5, a wireless frequency range including Wi-Fi and/or Bluetooth 105 includes a plurality of users in its proximity. Users A, B, and C are within proximity of wireless frequency range including Wi-Fi and/or Bluetooth 105, and their presence is indicated on the user interfaces of mobile computing devices of other users in wireless frequency range including Wi-Fi and/or Bluetooth 105. User D, who has recently left the wireless frequency range including Wi-Fi and/or Bluetooth, is also displayed as such.

Figure 6:
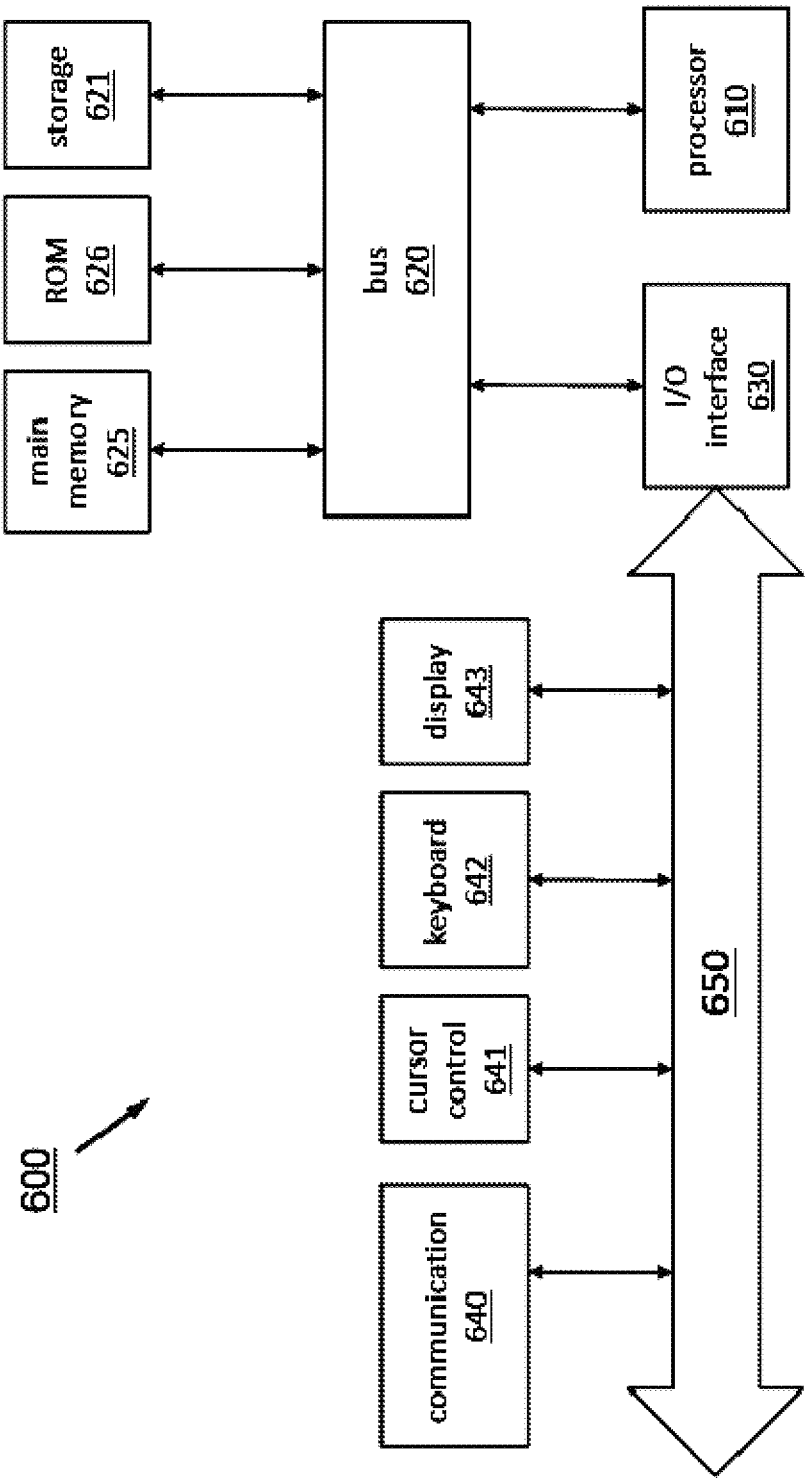
FIG. 6 is a schematic diagram illustrating an exemplary computer architecture for use with the present disclosure.

FIG. 6 is a schematic diagram illustrating an exemplary computer architecture 600 for use with the present disclosure. According to one configuration, server system employs architectures similar to that depicted in FIG. 6. The present disclosure comprises various computing entities that may have an architecture according to exemplary architecture 600. One configuration of architecture 600 comprises a system bus 620 for communicating information, and a processor 610 coupled to bus 620 for processing information. Architecture 600 further comprises a random access memory (RAM) or other dynamic storage device 625, which functions as a main memory, coupled to bus 620 for storing information and instructions to be executed by processor 610. Data storage device 625 also may be used for storing temporary variables or other intermediate information during execution of instructions by processor 610. Architecture 600 may also include a read only memory (ROM) and/or other static storage device 626 coupled to bus 620 for storing static information and instructions used by processor 610.

A data storage device 625 such as a magnetic disk or optical disc and its corresponding drive may also be coupled to architecture 600 for storing information and instructions. Architecture 600 can also be coupled to a second I/O bus 650 via an I/O interface 630. A plurality of I/O devices may be coupled to I/O bus 650, including a display device 643, an input device (e.g., an alphanumeric input device 642 and/or a cursor control device 641).

The communication device 640 allows for access to other computers (e.g., servers or clients) via a network. The communication device 640 may comprise one or more modems, network interface cards, wireless network interfaces or other interface devices, such as those used for coupling to Ethernet, token ring, or other types of networks.

In addition to the above-referenced functionalities, the system of the present disclosure comprises the following systems configuration to optimize the communication network. Once the first user has received a positive identity of a nearby user; both users will appear on each other's software modules.

Clustering

Figure 7A:
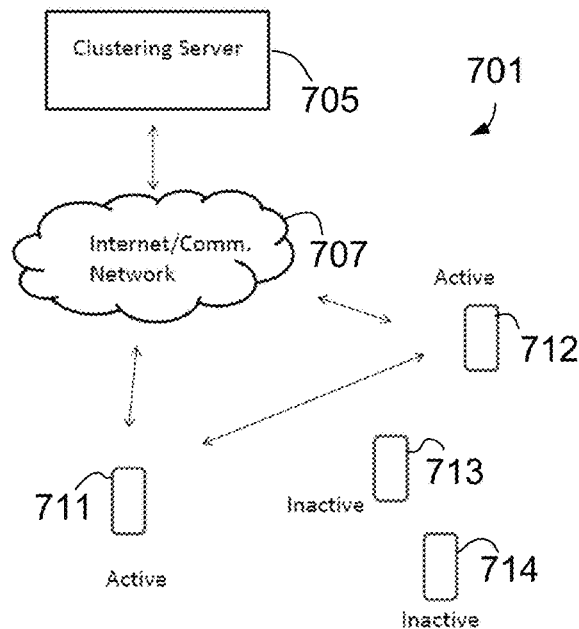
FIGS. 7A and 7B are schematic diagrams showing the operation of the system without and with an ability to respond when a mobile device is in an "inactive" mode.
Figure 7B:
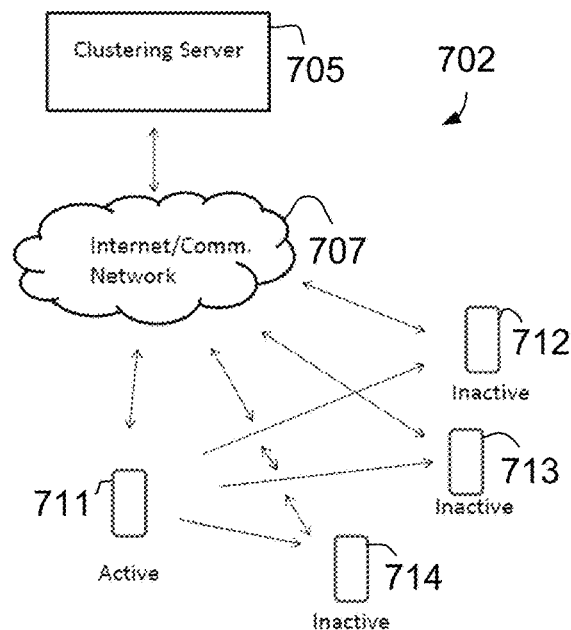

FIGS. 7A and 7B are schematic diagrams showing the operation of the system without and with an ability to respond when a mobile device is in an "inactive" mode. FIG. 7A shows a configuration of a system 701 in which "inactive mode" response is not enabled, whereas FIG. 7B shows a configuration of a system 702 in which the "inactive mode" is enabled. Both FIGS. 7A and 7B show clustering server 705, an internet and communication network, FIG. 7A shows a configuration in which "inactive mode" response is not enabled. Both FIGS. 7A and 7B show clustering server 705, an internet and communication network, represented by cloud 707 and multiple mobile devices 711, 712, 713, 714, associated with users.

As shown, system 701 also includes additional mobile devices namely mobile device 713 and mobile device 714, which are also registered with clustering server 1002. Mobile devices 711, 712, 713, 714 have been previously registered with clustering server 705.

FIG. 7A shows direct communications executed through internet and communication network 707 or directly device-to-device between active devices. Clustering server 705 is also communicably coupled to another mobile device 712 via internet and communication network 707. FIG. 7B shows the system operating as a proximity-based system in accordance with the mobile device able to respond when in an "inactive" state.

Configurations of the disclosed technology aggregates detected clusters of nearby users based on beacon detection. In one configuration, each user device includes a BLE (Bluetooth Low Energy) beacon that can transmit small amounts of data. Typically, transmission via BLE might be up to a distance of >100 meters. A configuration of the disclosed technology creates clusters of currently active user groups. In one configuration, clusters are populated by active users within proximity of each other. As an example, an active mobile device 712 might have an initiated clustering application and an active beacon; a mobile device 713 may include an initiated clustering application as well as an active beacon; and a mobile device 714 may include an initiated clustering application as well as an active beacon. Here, the cluster would be populated by mobile device 712 and mobile device 713 and mobile device 714.

Additionally, the system is able to be adjusted to provide a lag in the timeframe that individuals disappear from a user's nearby view controller. This is a critical element in extending the network of nearby users, so that more individuals will be visible to one another.

The shaded areas around mobile devices 712, 713 and 714 represent the Wi-Fi-range of mobile device 712.

Algorithm

The algorithm for aggregating users (i.e. populating user clusters) is based on periodic detection reports from mobile devices. Each listening mobile device periodically detect another mobile device and send information about the detected mobile device to the user. Specifically, each mobile device sends not only its identifier to a clustering server (e.g. server system 108) that stores and processes user and cluster membership information, each mobile device also sends the identifiers of other detected devices.

Mobile device 711 is active, that is, it has an active (advertising) beacon (not shown) and a proximity-based network application (not shown) that is active. Mobile device 712 also has an active beacon (not shown and a proximity-based network application (not shown) that is active.

In operation, because mobile device 711 is on (active), it can detect and communicate with mobile device 712, which is within proximity (Wi-Fi or Bluetooth based communication). Mobile device 712 can similarly communicate with mobile device 711 because they are proximal to each other. Each of mobile device 711 and mobile device 712 can further communicate with clustering server 705 via internet and communication network 707.

In contrast, mobile device 713 cannot communicate with mobile device 711 because mobile device 713 is inactive. No communication occurs as long as mobile device 713 remains inactive even though mobile device 711 is active. Here, inactive means that mobile device 713 has an active listening beacon but has a proximity-based network advertising application that is not running. Mobile device 714 also cannot communicate with mobile device 711 because mobile device 714 is inactive, having an active beacon and an inactive advertising proximity-based network application. Further, neither mobile device 713 nor mobile device 714 can communicate with clustering server 705 as mobile device 713 and mobile device 714 are inactive.

FIG. 7B shows what a proximity-based system 702 in accordance with the mobile device being able to respond when in an "inactive" state. In FIG. 7B, proximity-based system 702 includes clustering server 705 that is communicably coupled to mobile device 711 via internet and communication network 707. As shown, system 702 also includes additional mobile devices including mobile device 712, mobile device 713 and mobile device 714, which are have been previously registered with clustering server 705.

Mobile device 711 is active, that is, it has an active beacon (not shown) and a proximity-based network application (not shown) that is active. Mobile device 712, mobile device 713 and mobile device 714 are inactive; they each have a beacon;

however, their proximity-based network application (not shown) has not been executed and is inactive. By way of non-limiting example, a mobile device is "inactive" when the device's user interface application has been terminated intentionally by the user "shut down" or been sent to the background whereas. For example in some iPhones, the phone is "inactive" when the phone is not advertising Unique Identifiers (e.g., Bluetooth Low Energy UUID &/or Randomly Generated Identifier from 0 to 4294967295) but it is still listening to unique identifiers. Each time the mobile device senses a unique identifier advertisement the device immediately transmits this user's ID to the server via various methods including currently a web service call.

In operation, unlike the system 701 of FIG. 7A that requires that two mobile devices be active in order to communicate, in the configuration of FIG. 7B, communication is facilitated with "inactive" devices so long as at least one active advertising mobile device is present. As depicted in FIG. 7B, mobile device 711 is on (active). Once its proximity-based network application is open, mobile device 711 advertises and pings out or transmits signals across using wireless network including Wi-Fi and Bluetooth frequencies. Responsive thereof, although inactive, mobile devices 712, 713 and 714 are listening and do pickup the advertising signals from mobile device 711. Each of the listening mobile device 712, 713 and 714 then retrieves the Unique Identifier including but not limited to UUID (Universally Unique Identifier) and/or "randomly generated identifier" associated with mobile device 711. Then mobile device 712, mobile device 713 and mobile device 714 all separately send the retrieved Unique identifier, for example UUID "randomly generated identifier", for 711 as well as each of their own UUIDs to clustering server 902.

In one configuration, the communication from the mobile devices arrive as separate web service calls; the service calls are then logically linked and grouped based on pairs of the mobile device 711's Unique ID and the transmitters ID (UUID). This new user presence group is communicated to mobile device 711 and mobile devices 712, 713 and 714 and the result is that devices 711, 712, 713 and 714 "the users in proximity" appear as nearby users on the phones of devices 711, 712, 713 and 714. Without the assistance of the disclosed technology, the user of device 711 would not be able to see any of devices 712, 713 and 714. Therefore the disclosed technology is revolutionary in terms of its abilities to create a viable proximity based communication platform.

In a configuration, the clustering server applies the following algorithm to group them together:

1. User A sees User B
2.   Is user B in the system?
3.     No
4.       Is User A in the system?
5.         No
6.           Create presence group. Add user A and user B to presence group
7.         Yes
8.           Add user B to the presence group of A
9.             Update timestamp of both A and B in user record
10.   Yes
11.     Is User A in the system?
12.       No
13.         Add user A to the presence group of B
14.         Update timestamp of both A and B in user record
15.       Yes
16.         Is A in same presence group as B?
17.           Yes
18.             Update timestamps on A and B in user record
19.           No
20.             Update timestamps on A and B in user record
21.             Combine presence groups for A and B
22.             Take all users from presence group B, move to presence group A
23.             Delete presence group B In one configuration, after running through the above algorithm to create presence groups, a purge cycle is run. During a purge cycle, all users that are part of a presence group that have not detected any other user in the presence group or have not been detected by any other users in the presence group in a specified period are purged from their presence group. This period referred to as the timeout period may be 60 seconds, for example. Users that are grouped by detections will time out and become degrouped after an adjustable amount of seconds of no detections.

At the end of the above processing, the web service returns the list of identifiers for the other users that are in the same presence group as the user reporting detections.

Control of Clustering

Figure 8:
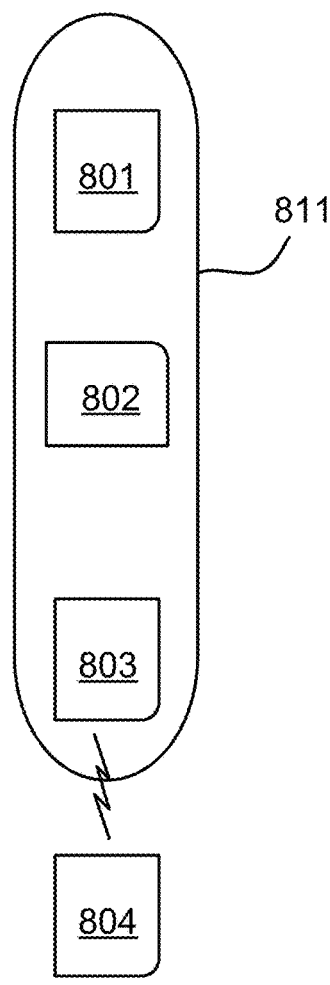
FIG. 8 is a schematic diagram of a group of mobile devices associated with users in proximity to each other and in proximity to a Wi-Fi hot spot.

FIG. 8 is a schematic diagram of a group of mobile devices 801-804 associated with users in proximity to each other and in proximity to a Wi-Fi hot spot 811. In this example, the system populates user clusters that include no more than one active user, such as mobile device 801, where the rest of the mobile devices 802, 803, 804 can be inactive. Generally, as an example, a user cluster might be populated with an active mobile device 801, an inactive mobile device 802 and inactive mobile device 803. Active mobile device 801 is a mobile/computing device that includes an active advertising beacon and a proximity-based network application developed in accordance with a configuration of the disclosed technology. Active mobile device 801 starts the proximity-based network application, which then remains active along with the beacon.

Inactive mobile device 802 is a mobile/computing device that includes an active advertising beacon as well as the proximity-based network application of the present configuration. Here, the proximity-based network application is not executed and remains inactive. This occurs for example on iPhones, in which, when the app has been put into the background or has been terminated by the user, the app will no longer advertise its Unique Identifier UUID 'and/or 'randomly generated identifier", and the fact that it stops advertising limits the nearby users able to detect it. This is also the permanent case for Android Devices 4.3 and higher which do not have Bluetooth LE Advertising Capabilities. Therefore the disclosed technology has created a viable system to workaround this technological limitation. Similarly, inactive mobile device 803 is a mobile/computing device that includes an active advertising beacon and an inactive proximity-based network application.

While mobile device 804 may be considered to be within a desired proximity to mobile device 801, mobile device 804 is outside of the proximity of Wi-Fi hot spot 811, and also is outside of direct communication range and Bluetooth LE Advertising Capabilities of mobile device 801. Mobile device 804 is, however within direct communication range and Bluetooth LE Advertising Capabilities of mobile device 803. Since mobile device 803 is able to relay the UUID and/or "randomly generated identifier" of mobile devices 801 and 804, mobile devices 801 and 804 are made aware of their mutual proximity.

This configuration also applies to the immediate sharing of secondary identified users. For example not only does mobile device 801 not wait for mobile device 802 to identify mobile device 801, but it already shows mobile device 801 on mobile device 802's display screen as soon as mobile device 802 is shown on mobile device 801's screen.

In one configuration, the system also shows mobile device 801 what is on mobile device 803's screen. For example the user of mobile device 801 sees mobile devices 802 and 803 but does not see mobile device 804, either because mobile device 804 is too far away or because it just has not processed it yet. In such a configuration, if any other user in proximity: if either mobile device 802 or mobile device 803 detects mobile device 804, then mobile device 801 will detect mobile device 804 as well. In this manner, there are no communication delays which are otherwise caused from users observing each other at different second intervals between network scans, in some cases with minute differentials. As soon as one person in the room picks up, everyone else gets up to speed.

Determining Proximity and Presence Group Selection

The "degrees of separation" or proximity are useful to control the size of the presence group. If the area has few local users, it is likely that the user would want to engage several degrees of separation until the physical proximity becomes too distant. On the other hand, if there are a large number of eligible users within a small area, then the user may elect to search for fewer degrees of separation.

Likewise, the user may wish to select according to category of user. For example, if the user is in a large gathering of people, the user may wish to select members of the user's university, members of the user's social group or another classification. The user may also wish to limit the group to people in the user's addressbook or other list of contacts.

Figure 9:
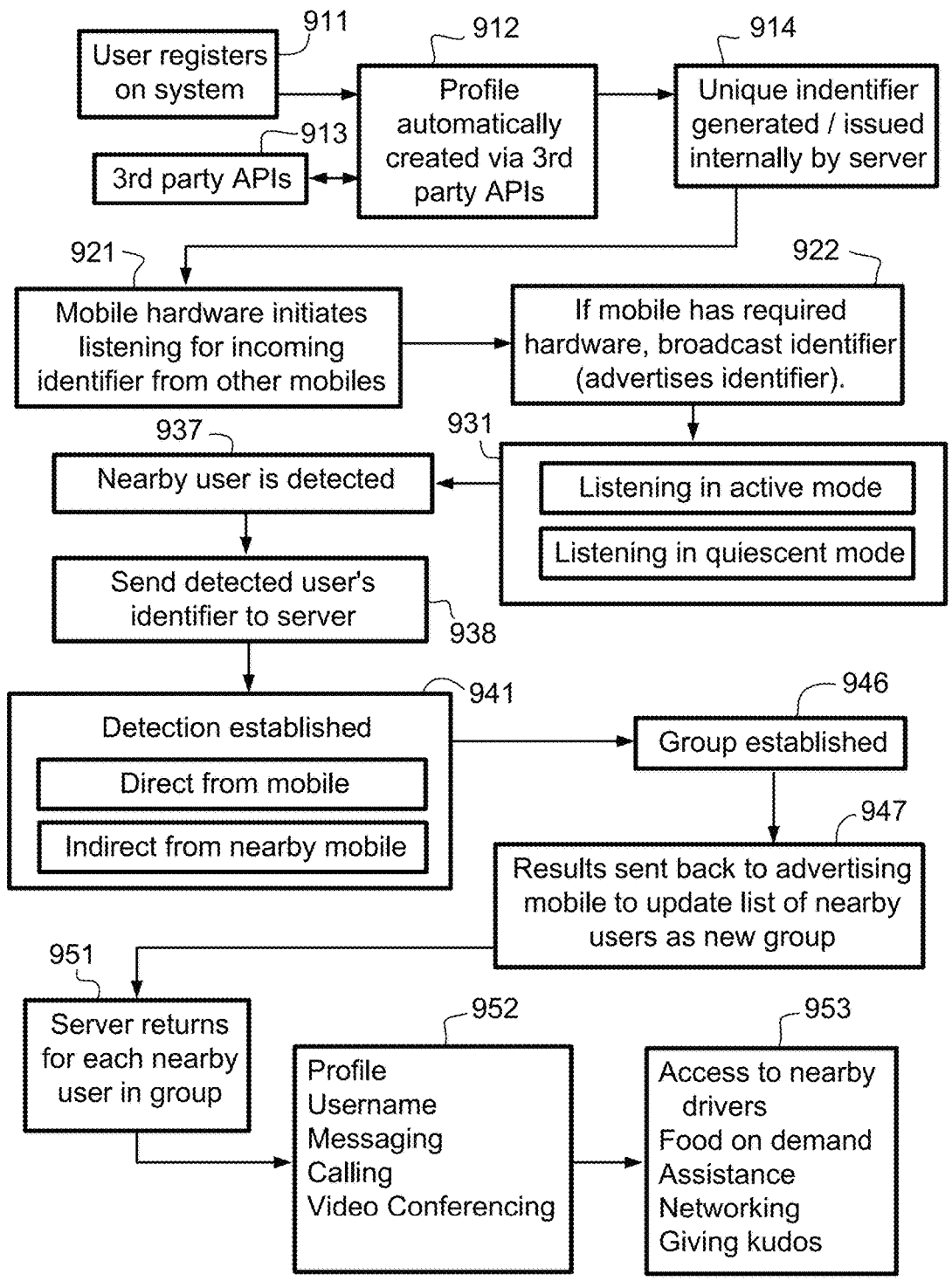
FIG. 9 is a schematic block diagram showing the communication used to establish groups.

FIG. 9 is a schematic block diagram showing the communication used to establish presence groups. A presence group is a set of other users within proximity to the user. The presence group may be established by direct connection via short range radio communication or through a Wi-Fi hotspot. Additionally, the presence group may comprise users who are connected by degree of separation, as will be described. Within this context, "advertising" refers to signaling the presence of a mobile device, such as by transmitting a radio beacon. By way of non-limiting examples, advertising can be performed via Bluetooth or Wi-Fi hotspots.

To establish a presence group, the user registers on the system (step 911). The user's profile is then automatically created via third (step 912) by third party application programming interfaces (APIs) such as social media APIs and other networks by which the user is known (step 913). It is further possible for the user to establish an identity with the system itself and use that identity for establishing a profile. The system's server then generates or issues a unique identifier for the user and links that unique identifier with the user's mobile device (step 914).

Once the unique identifier is generated or issued by the server (step 914), subsequent communications from the mobile device use that unique identifier. If the user has multiple mobile devices, the server may assign the same unique identifier (step 914) to these additional devices, much as a username-and-password combination can be used by someone to sign on through multiple devices.

The mobile then initiates listening for incoming identifiers from other mobiles. (step 921). The identifier is transmitted using standard communication protocols which are available on most Wi-Fi and Bluetooth communication systems. In addition to listening (step 921), if the mobile has the required hardware, the mobile broadcasts the unique identifier (step 922). This activity is referred to herein as "advertising" in that the wireless device "advertises" its presence during radio beacon transmissions.

The wireless device also listens (step 931) for other devices within its proximity. This is done in both active mode, with the wireless device having full communication and in a quiescent mode, in which the wireless device is not in full operation. If a nearby user is detected (step 937), the device sends the detected user's identifier to the server (step 938). The detection is then considered established (step 941).

The established detection (step 941) may be directly from the mobile or indirect from a nearby mobile device, which determines a "degree of separation". The "degree of separation" is similar to a degree of separation in a social sense in that a direct detection would be a first degree of separation (i.e., outside of the user's device). A second degree would be a connection identified as a separate device through which a user is in direct communication. Thus, returning to FIG. 7, if mobile device 712 is unable to communicate directly with mobile device 704, there must be more than one degree of separation between mobile devices 712 and 704. If there is a single intervening communication link, such as from mobile device 712 to mobile device 714 and thence from mobile device 714 to mobile device 704, there would be two degrees of separation between mobile devices 712 and 704.

The degrees of separation are applied to forming presence groups. Upon detection a presence group is established (step 946). The results are sent back to the user, as the advertising mobile, to update its list of nearby presence groups. The updated list is used by the mobile as a new presence group or updated presence group (step 947). The detections within the presence groups are:

Direct from mobiles broadcasting their identifiers; and
Indirect from mobiles transmitting the unique identifiers of other mobiles.

The system uses these direct and indirect transmissions of mobile identifiers to list users and the proximities of the users in terms of degrees of separation, in order to provide the user with an update of the user's presence group.

The server then returns data for each user in the presence group and allows communication between users. This data may be provided for all instances or provided in response to a request from the user's mobile either at the request of the user or automatically. Non-limiting examples of data transferred and communication comprise:

Username or usernames
User profile
Messaging
Voice communication
Video conferencing.

Other functions may be provided, which comprise, by way of non-limiting example:

Access to nearby drivers and ride sharing
Food on demand
Assistance in miscellaneous tasks ("Can you help me with . . . ?)
Networking
"Kudos" (called "Gold Gifts") or other social interaction awards from other users and user's photographs and other social media objects.

Additional features can optionally include:
Phone Numbers
Social Media Data
Registered Criminal Databases
Social Networking Services
Restaurant Critiquing Services Dating Applications
Customer Assistance Requests
Customer Ordering Systems
Payment systems The system and app have the ability to message, call and video other users. In one configuration, this ability is limited to users who within a predetermined proximity to the user. The predetermined proximity can be defined in terms of physical distance, visual proximity, distance as determined by radio signal strength, absolute received radio signal strength, boundaries stored on a server or any convenient means to define proximity. In some configurations, the user can limit communications through the system to be received from callers within a degree of proximity determined by the user, and in some configurations, the user can separately limit communications through the system to be sent to people called within a degree of proximity determined by the user. In other configurations, communications to or from other users may be made available for communications with other people selected by the user.

In addition, media may be broadcast to one or a group of, or all other users within a predetermined proximity to the user sending or requesting the broadcast.

The disclosed technology permits makes proximity via radio signals the determining factor if users can communicate with one another in the system's network, which itself functions as a social network. This feature can be combined with external social media applications, in that the user's communication preferences can be combined with proximity via radio signals. The combination allows the user to retrieve profiles that meet a predetermined combination of proximity via radio signals and identification of profile links ("Friends") on social media apps. A further configuration of the disclosed technology can disclose social media data, such as but not limited to Facebook. Integrating social media data thereby provides the ability for users to create special status and/or proximity alters of all and/or specific profile links (e.g., Facebook Friends) and/or individuals who have mutual profile links.

The disclosed technology is clearly not limited to strictly operating as a messenger; it has the ability to provide advantages over common social media apps in terms of providing a default close range social network. Because the individuals that the user views are the ones around the user, in the student housing, school and office environments the utility. The disclosed technology allows individual users to view the profiles of their nearby users including photo albums and personal/work information of make comments, start blog and forums, request and accept friendships, like pictures, forum postings, etc. Users have the ability to control their privacy settings to hide their profiles and choose to reveal them to everyone, only friends or on an individual basis.

User Displays Showing Proximity

FIGS. 10A-10C are representations of mobile device displays of contacts or other users to provide a proximity display. FIG. 10A depicts a starting page. FIG. 10B depicts a similar page obtained by removing message information (in the case of FIG. 10A incoming text messages). FIG. 10C depicts a selected contact, obtained either from the displayed contacts, a message, voice call or other action, in which the contact is depicted in an enlarged format. In this non-limiting example, contacts within a predetermined range of proximity are displayed as images; however, it is anticipated that individual users may select alternative displays, such as text, text and thumbnail image, etc.

Referring to FIG. 10A, the starting page has the ability to automatically adjust vertically based on the number of nearby users. Therefore when there are no users nearby, the message list will reach the top of the screen and the user will not need to constantly jump back from page to page to check for nearby users. In contrast, the more users that appear, the lower the Message Bar will sink down limiting to one viewable message. Users identified as having social media links with the user are flagged, as indicated at 1011, 1012.

The disclosed technology includes a logical user interface which incorporates a control viewer providing users with an adjustable scrolling grid display of all the users nearby; the viewer constantly adjusts as new nearby users are detected and previously detected users have left proximity after a predetermined amount of seconds. The Nearby User display shows users profile picture, User Name and also identifies if the user is a social network link, such as a Friend or Mutual Friend on Facebook, a Connection or Mutual Connection via Linkedin or any other social network that may be integrated into the disclosed technology.

Removal of the message bar is shown in FIG. 10B. Communication with a particular contact highlights that contact, as shown in FIG. 10C. These are the default user settings, which are adjustable by user preferences.

The disclosed technology has the ability to integrate with registered criminal databases in partnership with law enforcement agencies in order to warn parents of potential threats within close proximity.

The disclosed technology provides the ability to display users social networking services, such as but not limited to LinkedIn profiles; naturally this will be most applicable in conferences, retreats and business networking events whereas users will have the ability to display their resume and business experience as part of their profile, thereby allowing users to rapidly filter the nearby business contacts and expedite their networking goals by focusing on starting conversations with prescreened business interests.

The disclosed technology provides the ability to integrate restaurant and business critiquing crowd-source review publishers services, such as but not limited to Yelp, in such way that members of the service will be able to opt-in to the disclosed technology enabling them to identify nearby members within the restaurant and discuss applicable (as well as non-applicable) feedback and input regarding the restaurants and potential dishes of interest or promoted by the restaurant.

The disclosed technology provides the ability to integrate with geo-based dating applications such as but not limited to Tinder; providing a up-close proximity dating application; most applicable in a nightclub venue settings whereby users will identify their interest and create matches in-close proximity able to instantly communicate in person; therefore exponentially increasing the effectiveness of the app's ability to make successful matches.

The disclosed technology provides the ability to integrate customer service systems in order to facilitate customers requesting assistance. For example customer at Walmart needs help on aisle 4, utilizing the disclosed technology he can write an SMS to "Walmart Service Reps" and assistance will confirm that they are on their way. Additionally assistance can rapidly answer geographic based questions regarding locations of goods, etc.

The disclosed technology provides the ability to integrate ordering systems: Customers will utilize the disclosed technology in order to place an order for goods or services; for example ordering meat at the deli counter at a supermarket.

The order is send in an SMS and the order is confirmed with a responding SMS from the butcher.

The disclosed technology provides the ability to integrate a links to payment systems, such as but not limited to Google Wallet, Apple Pay and PayPal, in order to facilitating purchase to consumers; following the above example the deli counter at a supermarket, the butcher can include, within the order confirmation, a google wallet link enabling the client to click the link and instantly portal to the appropriate google wallet payment screen, thereby further streamlining commerce.

Sustain

The user can set a persistence of presence, by which other users are able to identify that user. Thus, if a user enters an area, other users are able to identify the user according to the proximity and clustering criteria. If the user elects to "sustain" that proximity, the system will continue to provide other users with a proximity indication, even though the user has left the area. The persistence of the "sustain" function remains until the user's own timeout has expired, or the other user clears "sustain" users who are not present. It is further possible to provide users with an indication as to whether a persistent "sustain" user remains in the area.

The "sustain" function can be set by the user for various amounts of time according to the user's selection. By way of non-limiting example, the "sustain" function may be set by the user from 1 second to infinite, with an option for no sustain (0 sec). Infinite "sustain" would leave the duration to other users, who would clear their persistent profiles on a regular basis.

The "sustain" function can be useful in circumstances where a user wishes to be available for communication or identification after having left the area. Thus, if another user wishes to link a profile to someone who was in an area, this remains possible even if the user to be identified has physically left the area.

Situational Awareness

The ability to cluster users and identify users according to other categories allows users to identify soldiers in the military environment. The soldier can use the technology to identify the presence of members of the soldier's unit within a group, and to identify the presence of soldiers with a particular identified capability. The two groupings, combined with degree of presence can be used by the soldier to identify available assistance.

Similarly, if a soldier becomes lost or separated from the soldier's unit, the technology can be used to provide the unit information regarding the soldier's location, both directly through triangulation and proximity, and indirectly through the soldier's ability to transmit geographical coordinates. The system can further be used by the soldier to identify the location of others in the unit.

The use in a military situation may require that the data be retained in encrypted format, so that it cannot be used by an enemy. Similar, radio transmissions must be maintained in a manner which does not lead to enemy units triangulating on the soldier making the transmission. Since the proximity information can be controlled by a server, the availability of the location information can be controlled by the military. The ability to store location data on a server allows the system to only transmit location data to other users (soldiers) as encrypted data.

Other than the need to protect and encrypt location data, the feature is configured in a manner similar to combining proximity with external social media applications, in that the user's communication needs can be combined with proximity via radio signals. The combination allows the user to retrieve information regarding fellow soldiers that meet a predetermined combination of proximity via radio signals and identification of skills or unit association.

File Sharing, File Transfer and Media Sharing

The ability for a user to use the disclosed technology to identify other users within a proximity facilitates file sharing and media sharing, which may be relevant to the locus of the users or relevant to the individual users themselves. By way of non-limiting example, this could relate to the user commenting on a local event at which the user is present. Additionally, a speaker or entertainer can provide access of a media file to an audience or others nearby. This provides an ability to promote or advertise one's music, including songs, albums and randomized playlists to nearby users, additionally creating a community of music. This also allows file transfer to occur using local network facilities or directly as peer-to-peer transfers.

Additionally the software will use an algorithmic rating system to compare and rate users' taste in music in contrast to other nearby users. The rating and a comparison with similar media can be accomplished within the area of proximity defined by the user or by other users.

In addition to the presumed relevance of media files to others within a defined proximity, the ability to share media is based on a concept that these people would enjoy getting to know each other based on their similar taste in the media, such as a particular type of music or music by a particular artist.

API (Configuration)

FIGS. 11A and 11B are schematic diagrams depicting a Presence Group Aggregation System platform in its functional aspect. FIG. 11A shows establishing proximity. FIG. 11B is a three ring model, based on the diagram of FIG. 11A, based on a user's nearby user experience.

Although an Application Programming Interface (API) is provided herein, one of skill in the art will understand that the API is exemplary and other APIs consistent with the spirit and scope of the disclosed technology may be utilized. In a configuration, a request stating that mobile user with UUID 1 (for example) can see another user with UUID 1 and UUID3; as an example:

An empty array of other_user_identifiers may also be passed up, which is useful for querying the system to see which other users are detectable via the aggregation algorithm. Whatever is passed, a successful response returns a list of all the aggregated users in proximity like this:

{"identifier":"6", "other_user_identifiers": ["5","7","9", "11"]}

Timeout

Users that are grouped by detections will time out and become degrouped after a predetermined amount of time of no detections.

The Presence Group Aggregation System platform provides the required framework to create visual proximity "Degrees of Separation" or Rings as well as a View Controller User Interface to implement this functionality.

This tool is useful when a user is interested in reducing the nearby user field into a workable sum, for example just the students in a classroom. The Presence Group Aggregation creates a nearby user contact list based on all the direct and indirect user connections available. In the figure below, IRY has direct connections to ALY, NERO, OREN and COOK. IRY has indirect Second Degree Connections with MONKEY and ALB and Third Degree Indirect Connections with Ape and Banana. The Disclosed technology provides the users with the ability to filter out Users based on the degrees of connection: first, second, third, fourth etc. This is naturally most useful in very highly dense settings.

Rings are differentiated with the following logic—
The formula for the logarithm is:
First Ring (Degree of Separation)=This includes users' first degree "DIRECT" Contacts, users that the subject has detected and "INDIRECT" web service calls of the subject as advertiser made by listening only devices (Permanent Listening only users=Users with no listening but no advertising hardware and Temporary Listening Devices=iOS devices where the application has cancelled or has stopped running while in the background.)

Second Ring (Degree of Separation)=This includes all the results from the Peers in subjects First Ring "DIRECT" and "INDIRECT" connections excluding all entry pairs that include the subjects unique identifier.

Third Ring (Degree of Separation)=This includes all the results from the Peers in the subjects Second Ring "DIRECT" and "INDIRECT" connections excluding all the entry pairs that include the subject and all the subjects First Ring connections.

FIG. 11B shows user IRY's nearby user experience. The Presence Group Aggregation System platform creates a cluster including all of the users depicted in FIG. 11A. Within the cluster, Rings are differentiated with the following logic:

Ring 1=Direct and webservice UUIDs including user's UUID

Ring 2=Direct and webservice of user's First Ring connections, excluding entries and web calls with user's UUID. (OREN, NERO)

Ring 3=Direct and webservice of user's second ring connections, excluding entries and web calls with user's UUID and First Ring connections. (MONKEY, ALB)

The Presence Group Aggregation System platform allows the system to provide users with the ability to reduce and extend their visible contacts via "Inherent Rings" representing degrees of separation. This reduces a random cluster of nearby users into an immediate group of "first Ring" members. The "first Ring" members can be people within a small room, such as a classroom or business establishment or otherwise within a small area.

A filter button 1031, shown in FIG. 10B can be used to determine which profiles and which Rings are presented. The control of the Rings and other proximity controls may be accessed through the "Filter" button which will be easily accessible one the main user interface screen, by pressing this button, the display will reveal to the user will the filters, "Rings" or "degrees of separation" that are available to be implemented.

CONCLUSION

While mobile devices have been described and the use of information from specific networking services has been described, it is also possible to use other devices and services. For example, desktop devices can be used to identify Inherent Rings based on information identified through network connections, as manually designated by the user or as matched by the user to a particular location of a mobile device (i.e., "Make my location the present location of my phone.) It is possible to either permit or not permit the sharing of unique identifiers across multiple devices, and multiple devices can be associated with a single user or user profile as desired. In that way, multiple devices belonging to a user can be issued separate unique identifiers or can share unique identifiers, and the user can still be uniquely identified across multiple devices. In the case of multiple devices, the user can designate one or more devices as having a priority on the system, in order to avoid the use of multiple devices causing duplication of profiles displayed on other users' devices.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A system for establishing between a plurality of users A, B, C, D, each user having a mobile computing device (104, 102, 210, 212, 204, 202), a network based on proximity, said system comprising:
   a server (108)
   the server communicating with a plurality of mobile computing devices, each mobile computing device being associated with a user and comprising:
      means for connecting the mobile computing device to the server (108) and registering on said server through a network (107);
      means for broadcasting of data;
      means for detecting of data broadcasted by another mobile computing device;
   a database connected to the server and comprising information associating registered users, broadcasted data, and mobile computing devices;
   wherein, the server receives communications from the mobile computing devices which use an application set up on the mobile computing device to communicate to the server proximity information from the mobile computing devices obtained by the mobile computing devices scanning and listening for broadcasted data by other mobile computing devices;
   wherein the server connects with the mobile computing devices and compares the information retrieved from the detected broadcasted data from other mobile computing devices with the information stored in the database, the server thereby enabling communication between the registered computing devices within proximity of each other.

2. The system according to claim 1,
   wherein the mobile computing devices are within proximity of each other when they are in a WiFi® or Bluetooth® range (105, 205) of one another, and when a mobile computing device can detect the data broadcasted by the other mobile computing devices,
   and wherein the data broadcasted by the mobile computing devices of user A and B are in their respecting range, and whereby the data broadcasted by the mobile computing devices of user D and B are in their respective range, but out of range of the mobile computing device of user A, wherein the application enables the communication between user A and user D.

3. The system of claim 1, wherein the server:
   saves and stores unique identifiers for each mobile computing device;
   associates a user profile with each unique identifier;
   receives from one or more of said mobile computing devices, at least one unique identifier detected by said mobile computing device;
   creates a unique cluster of mobile computing devices, the cluster comprising the detected mobile computing device and a mobile computing device associated with the detected unique identifier;
stores said unique cluster the server;
merges clusters that contain at least one common unique identifier;
transmits to the mobile computing devices in the clusters a list of users or mobile computing devices within the cluster.

4. A method for providing communications between a plurality of users, the method comprising:
communicating, through a server, with a plurality of mobile computing devices, each mobile computing device being associated with a user, and which use an application set up on the mobile computing device to communicate with the server, said application:
causing the mobile computing device to broadcast data for a predetermined period of time,
causing the mobile computing device to scan and listen for broadcasted data by other mobile computing devices;
connecting the mobile computing device to the server (108) and comparing the information retrieved from the detected broadcasted data with the information stored in the database; and
enabling communication between the registered computing devices within proximity of each other,
registering each user on the server (303);
generating a unique identifier for each registered user, and storing the unique identifier on the server (305, 306), and providing the unique identifier to respective ones of the mobile computing devices to be stored on the respective mobile computing devices;
associating a user profile with each unique identifier;
causing the plurality of the mobile computing devices to broadcast their unique identifiers (307);
causing the plurality of the mobile computing devices to listen (308) for incoming identifiers from other mobile computing devices;
in the case of a first mobile computing device of a user A, detecting a second mobile computing device of a user B, receiving from the second mobile computing device the unique identifier associated with the second mobile computing device;
using the unique identifiers of the first mobile computing device and the second mobile computing device to establish detection, using the established detection to form a group of two or more mobile computing devices (312);
transmitting to the first mobile computing device a list of users or an updated list of users in the group; and
in the case of the first mobile computing device not having profile information regarding users associated with other mobile computing devices in the group, providing at least a subset of profile information associated with the list of users in the group to the first mobile computing device.

5. The method of claim 4, wherein the detection comprises detections made directly between two mobile computing devices, detection between two mobile computing devices through an external radio communication device, or indirect detection through another mobile computing device or devices linking the first mobile computing device and the second mobile computing device.

6. The method of claim 4, wherein the mobile computing device of user A being in the range of the mobile computing device of user B, and wherein the mobile computing devices or users A and D are not in range, but where D is in the range of the mobile computing device of user B:
forming a group comprising users A, B and D,
whereby the data broadcasted by the mobile computing devices of user A and B are in their respecting range, and whereby the data broadcasted by the mobile computing devices of user D and B are in their respective range, but out of range of the mobile computing device of user A, wherein the application enables the communication between user A and user D.

7. The method of claim 6, wherein the establishment of the group comprises an algorithm comprising the steps of:

```
1  when communication is enabled between the mobile computing device
   of a user A and the mobile computing device of a user B,
2    is user B in the system,
3    No
4      is user A in the system,
5      No
6        create group, add user A and user B to group
7      Yes
8        add user B to the group of A.
```

8. The method of claim 7, wherein the algorithm for establishment of the group further comprises the steps of:

```
10  when user B is in the system;
11    is user A in the system,
12    No
13      add user A to the group of B.
```

9. The method of claim 8, wherein the algorithm further comprises the steps of:

```
15  If user A in the system,
16    is A in same group as B,
19    No
21      combine groups for A and B
22      take all users from group B, move to group A,
23.     delete group B.
```

10. The method according to claim 7, wherein the algorithm further comprises the steps of updating a timestamp on user A and user B in user record once A and B are in the same group.

11. The method of claim 4, wherein:
the associating of the user profile with unique identifier comprises:
identifying third party application programming interfaces (APIs) containing profile information;
allowing the user to link the profile information from the APIs to the unique identifier; and
allowing the user to create a profile for storage on the server.

12. The method of claim 4, wherein:
the causing of at least a plurality of the mobile computing devices to listen for incoming identifiers from other mobile computing devices comprises:
during a mobile computing device's quiescent or inactive mode, providing sufficient device resources to listen for incoming signals carrying unique identifiers from other mobile computing devices; and
in the event of receiving the incoming signals carrying unique identifiers, transmitting an indication of receipt of the unique identifier.

13. The method of claim 4, further comprising:
receiving, from the mobile computing device an image of a person; and
using facial recognition to determine if a match exists between the image and a user detected in proximity to the device providing the image of the person.

14. The method of claim 4, further comprising:
in the case of the second mobile computing device detecting a third mobile computing device, receiving a unique identifier from the third mobile computing device, relayed through the second mobile computing device; and
using the detection of the third detected mobile computing device as a part of a group of the first mobile computing device.

15. The method of claim 14, further comprising:
for a given mobile computing device, establishing a degree of separation according to minimum number of device detections that separate the given mobile computing device and another mobile computing device; and establishing Presence Groups corresponding to the degrees of separation of mobile computing devices, with one or more degrees of separation defining each Presence Group.

16. The method of claim 4, further comprising:
providing a "sustain" function, by which a user can select a time period or degree of physical movement during which the user will remain in the Presence Groups of other users unless the other user clears users who invoked the "sustain" function.

17. The method of claim 4, further comprising:
providing a user selection filter, whereby the user may filter according to degrees of separation, pre-existing relationships as established by user profiles and pre-existing relationships established by a user's address-book.

18. The method of claim 4, further comprising:
determining proximities to the user of other detected devices the proximities established by at least one of the group consisting of physical distance, visual proximity, distance as determined by radio signal strength, absolute received radio signal strength, boundaries stored on a server and other defined proximity determination;
establishing degrees of separation based on at least one of the proximity of the user or a number of communication links separating users;
establishing at least one group, called a Presence Group, based on the degrees of separation; and
providing the user with a listing of other users based on groups selected by the user.

19. The method of claim 18, further comprising:
establishing at least one Presence Group comprising at least one device within a predetermined distance of the user, the predetermined distance established by at least one of the group consisting of physical distance, visual proximity, distance as determined by radio signal strength, absolute received radio signal strength, boundaries stored on a server and other defined proximity determination.

20. A method for providing communications between users of mobile computing devices based on proximities between the users, the method comprising:
providing an application set up on the mobile computing device;
using the application to cause the mobile computing device to identify a device location;
using the application to cause the mobile computing device to identify at least a second device within a predetermined proximity to the user, the predetermined proximity established by at least one of the group consisting of physical distance, visual proximity, distance as determined by radio signal strength, absolute received radio signal strength, boundaries stored on a server and other defined proximity determination;
using the application to cause the mobile computing device to identify at least one further device within a predetermined proximity to one of the user and the second device;
using the application to cause the mobile computing device to establish degrees of separation based on at least one of the proximity of the user or a number of communication links separating users;
using the application to cause the mobile computing device to establish at least one Presence Group based on the degrees of separation; and
using the application to cause the mobile computing device to provide the user with a listing of other users based on Presence Groups selected by the user.

21. The method of claim 20, further comprising:
establishing at least one Presence Group comprising at least one device within a predetermined distance of the user, the predetermined distance established by at least one of the group consisting of physical distance, visual proximity, distance as determined by radio signal strength, absolute received radio signal strength, boundaries stored on a server and other defined proximity determination.

22. The method of claim 21, further comprising:
the associating of the user with a profile, the profile comprising an administrative group or military unit and a capability;
providing the user with a selection of other users within the Presence Groups in accordance with user-selected criteria comprising profile information from user profiles corresponding to the user's profile; and
storing, in the server, location information for the user, thereby providing other personnel in the administrative group or a military entity with an ability to locate the user.

23. A system for establishing between a plurality of users A, B, C, D, each user having a mobile computing device (104, 102,210, 212, 204, 202), a network based on proximity, said system comprising:
a server (108)
the server communicating with a plurality of mobile computing devices, each mobile computing device being associated with a user and comprising:
means for connecting the mobile computing device to the server (108) and registering on said server through a network (107);
means for broadcasting of data;
means for detecting of data broadcasted by another mobile computing device;
a database connected to the server and comprising information associating registered users, broadcasted data, and mobile computing devices;
wherein, the server receives communications from the mobile computing devices which use an application set up on the mobile computing device to communicate with the server, said application:
causing the mobile computing device to broadcast data for a predetermined period of time, causing the mobile computing device to scan and listen for broadcasted data by other mobile computing devices;

connecting the mobile computing device to the server (108) and comparing the information retrieved from the detected broadcasted data with the information stored in the database;

enabling communication between the registered computing devices within proximity of each other.

* * * * *